United States Patent Office 3,254,843
Patented June 7, 1966

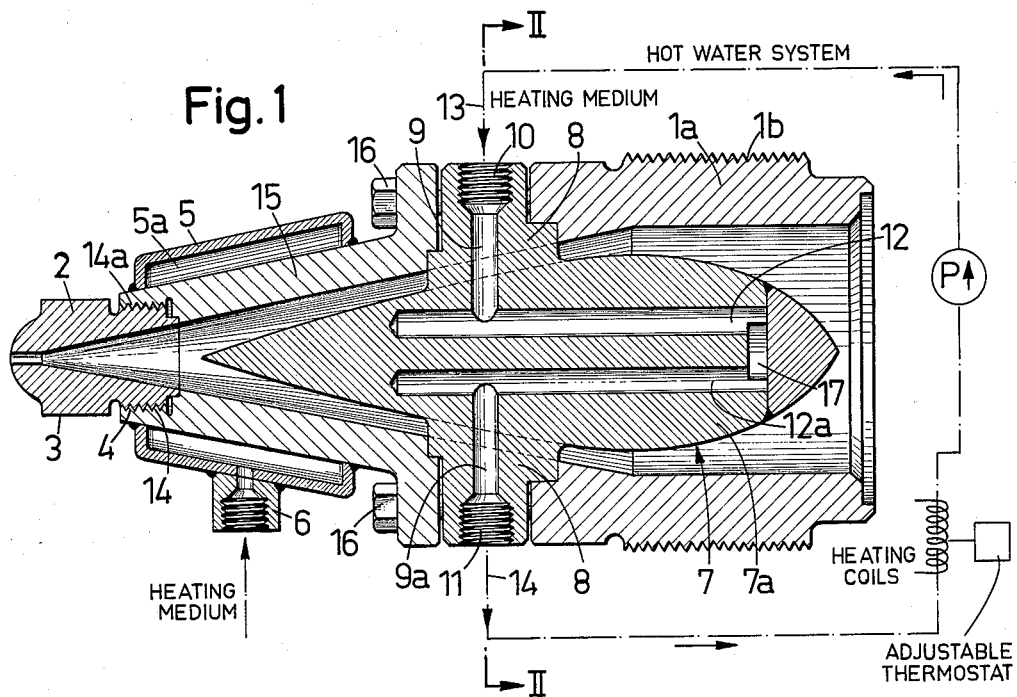
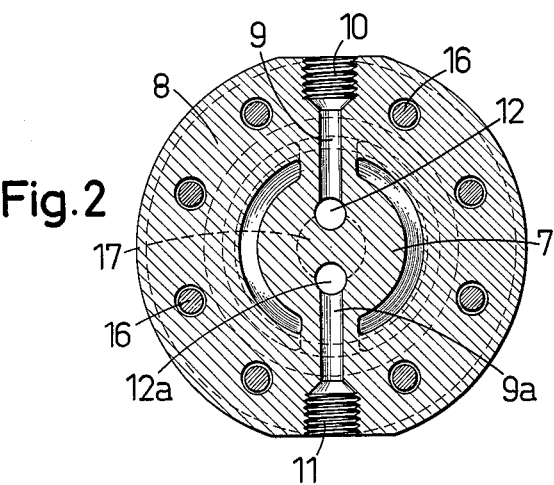

3,254,843
INJECTION NOZZLE, ESPECIALLY FOR INJECTION MOLDING OF ARTICLES OF RUBBER MATERIAL
Karl Huff, Ahlem, near Hannover, and Dieter Holm, Hannover-Stocken, Germany, assignors to Continental Gummi-Werke Aktiengesellschaft, Hannover, Germany
Filed Nov. 25, 1963, Ser. No. 325,831
Claims priority, application Germany, Nov. 26, 1962, C 28,500
2 Claims. (Cl. 239—132)

The present invention relates to an injecton nozzle, especially for molding articles of rubber material, which comprises a mouth-piece and a head. The nozzle through which the mixture of rubber raw material is injected under pressure into a vulcanizing mold, is heated in a manner known per se. In connection with the injection molding of thermoplastic synthetic material, it is known to heat the material passing through an injection nozzle from the outside through the wall of the nozzle. When applying such injection nozzle for injection molding of rubber material, considerable difficulties have been encountered, and it has been found that when injection molding articles of rubber, an extremely precise temperature of the preheated mixture in the injection nozzle is an indispensable prerequisite.

It is, therefore, an object of the present invention to provide an injection nozzle of the above-mentioned general type which will bring about an intensive uniform and precise heating of the mixture of raw material passing through the head and mouth-piece of the nozzle.

It is another object of this invention to provide an injection molding nozzle as set forth above, which makes it possible precisely to control and equalize the temperature of the raw mixture in the nozzle prior to leaving the same through the nozzle mouth, without encountering the drawback of providing long heat paths.

These and other objects and advantages of the invention will appear more clearly from the following specification in connection with the accompanying drawing illustrating in longitudinal section an injection nozzle according to the present invention.

The injection nozzle according to the present invention is characterized primarily in that the injection nozzle comprises a heating body, preferably of a torpedo-shaped longitudinal section, which is provided with conduit means leading to the exterior of the injection nozzle and adapted to be connected to a supply line and a discharge line for a heating medium. The heating medium which is customarily employed for the outer heating of the injection nozzle, for instance, steam or electricity, may also be employed for heating the inner heating body according to the invention. However, advantageously, a separate circuit is provided for the heating medium intended for heating the inner heating body so as to make it possible to control the mixing temperature in the interior of the nozzle independently of the temperature of the nozzle wall. When employing liquid or gaseous heating media, the heating body may be provided with at least two bores extending in the longitudinal direction of the nozzle, said bores having one end thereof in communication with each other, whereas the opposite ends of said bores are individually connected with conduit means for supplying and discharging the heating medium.

A particularly advantageous effect will be obtained when the said bores in the heating body are connected to a warm water heating system arranged outside the injection nozzle. Such an arrangement makes it possible to control the temperature of the raw mixture in the nozzle not only in an upward sense but also with the same precision and practically without delay, in a downward sense. It will be appreciated that undesired temperature peaks which may occur by the formation of turbulence and the friction of the flow of the mass along the walls of the nozzle harmfully affect the subsequent vulcanization operation. Such temperature peaks can immediately be eliminated by and conveyed to the warm water of said warm water heating system. The heating medium, in this instance, simultaneously acts as cooling medium by carrying away the excessive heat.

Referring more specifically to the drawing, the injection nozzle shown therein forms the discharge portion of an injection molding press cylinder (not shown) which is charged with the raw mixture of the rubber material and in which the raw mixture of rubber material is preheated step-wise and, by an injection piston, is stroke-wise conveyed in the direction toward the injection nozzle. For purposes of carrying out an injection molding operation, the injection nozzle is pressed against the injection opening of a heated vulcanizing mold into which a certain quantity of preheated raw mixture of rubber material is injected, and subsequently vulcanized. The injection nozzle, generally designated 1, tapers toward its front portion, which carries an exchangeable mouth-piece 2. This mouth-piece 2 may, in conformity with the composition and property of the rubber mixture to be processed, and in conformity with the shape and volume of the mold chamber, be selected of different cross-section. The mouth-piece 2 may be provided with a hexagonal surface 3 so that it can be grasped by a wrench, and is furthermore provided with a thread 4 threadedly engaging a corresponding thread 14a in a bore 14 of the tapered member 15 of the nozzle 1. The nozzle itself has one or more outer heating jackets of which, for purposes of simplicity only, one heating jacket, viz the jacket 5, is shown. This heating jacket 5 is formed by an annular member of sheet metal so as to confine with the outer wall of tapered member 15 a heating chamber 5a. Connected to the heating jacket 5 is a connection 6 to which a supply line for the heating medium may be connected and through which the heating medium is passed into the heating chamber 5a. It is, of course, to be understood that instead of a heating medium which may be liquid or gaseous, also electric heating could be employed.

The heating nozzle furthermore comprises a head 1a adapted by means of its outer thread 1b to be connected with the injection molding press. In conformity with the present invention, between the head 1a and the tapered or conical member 15 there is interposed a heating body 7. This heating body 7 comprises a central portion 7a of torpedo-shaped axial section and outwardly extending sections 8 clamped between head 1a and conical member 15 and firmly held therebetween by means of bolts 16. The torpedo-shaped portion 7a is substantially coaxially arranged within the nozzle parts 1a and 15 in such a manner that the more blunt portion of the torpedo-shaped member 7a points in the direction counter to the direction of flow of the material to be injected through the nozzle, whereas the more pointed portion of the torpedo-shaped part 7a points in the direction toward the mouth-piece 2.

As will be evident from the drawing, the interior of the torpedo-shaped part 7a is provided with two or more radial bores 9, 9a having a broadened outer section 10 and 11, respectively, for connection with the inlet of a heating medium supply line and the outlet for a heating medium discharge line, respectively. The interior ends of bores 9 and 9a communicate with longitudinal bores 12, 12a respectively, which are interconnected at one end by passage means 17 while the opposite ends of said bores 12, 12a are closed.

It will be appreciated from the above that after the section 10 has been connected with a warm water supply line and the section 11 has been connected to a warm water discharge line, a continuous waterflow in the direction of the arrows 13 and 14 through the heating body 7 can be maintained. It is also obvious that the heating supply line and heating discharge line may be arranged in a circuit with control means therein so as to maintain the temperature of the heating body 7 at precisely desired values.

It will also be appreciated that the provision of a heating body according to the present invention within the path of flow of the mixture, in addition to furnishing an improved temperature control, also aids in the intermixing process of the flow of the mass, while the resistance against the dynamic flow pressure is held at a minimum by the torpedo-shape of the member 7a.

It is, of course, to be understood that the present invention is, by no means, limited to the particular construction shown in the drawing, but also comprises any modifications within the scope of the appended claims.

What we claim is:

1. A nozzle unit for use in connection with the injection molding of rubber articles, which comprises: a front body including a mouth-piece connected thereto, said front body confining a conical chamber tapering toward said mouth-piece, a rear body adapted to be connected to the outlet of an injection molding press and arranged in axially spaced relationship to that end of said front body which is remote from said mouth-piece, said rear body confining a substantially cylindrical chamber with the axis thereof in substantially axial alignment with the axis of said conical chamber, a heating body of substantially drop-shaped longitudinal section with radially outwardly extending holding sections interposed between said front and rear bodies and in axial alignment therewith while being provided with conduit means extending in axial direction of said heating body, and connecting means firmly connecting said holding sections to said front and rear bodies to thereby unite the same to a unit, said heating body including a first section extending from one side of said holding sections in axial direction of said first body into the same while tapering toward said mouth-piece and confining with the interior of said front body an annular conical passage, said first section forming the thinner portion of said drop-shaped heating body, said heating body also including a second section extending from the other side of said holding sections into said cylindrical chamber and forming the thicker portion of said drop-shaped heating body while confining an annular chamber with the inner wall of said rear body, said last-mentioned annular chamber decreasing in cross-section toward and communicating with said conical chamber, said heating body also being provided with radial conduit means respectively communicating with said axial conduit means and leading through said outwardly extending holding sections to the outside of said nozzle unit for connection with a heating fluid supply and with a heating fluid discharge line respectively.

2. A nozzle unit according to claim 1, which includes a hot water heating system comprising a pump having its pressure side in communication with one of said radial conduit means for feeding a hot fluid therethrough into said heating body and having its suction side in communication with another one of said radial conduit means for withdrawing said fluid through the latter from said heating body, said heating system also including control means for varying the temperature of the fluid passing through said heating system to thereby control the temperature of said heating body.

References Cited by the Examiner

UNITED STATES PATENTS 2,893,642  7/1959  Callery _____ 239—132

FOREIGN PATENTS 669,493  8/1929  France.
995,438  8/1951  France.

EVERETT W. KIRBY, *Primary Examiner.*